(12) United States Patent
Johnson et al.

(10) Patent No.: US 7,023,680 B1
(45) Date of Patent: Apr. 4, 2006

(54) TRANSIENT VOLTAGE PROTECTION AND GROUND STATUS MONITORING APPARATUS AND METHOD

(75) Inventors: David Allan Johnson, Thornton, CO (US); Pine Marion Brummett, Brooksville, FL (US)

(73) Assignee: PSG Enterprises, Inc., Spring Hill, FL (US)

( * ) Notice: Subject to any disclaimer, the term of this patent is extended or adjusted under 35 U.S.C. 154(b) by 324 days.

(21) Appl. No.: 10/605,817

(22) Filed: Oct. 29, 2003

(51) Int. Cl.
*H02H 1/00* (2006.01)

(52) U.S. Cl. .................... 361/111; 324/74; 340/649

(58) Field of Classification Search ............... 361/117
See application file for complete search history.

(56) References Cited

U.S. PATENT DOCUMENTS

| | | | | |
|---|---|---|---|---|
| 3,913,010 A | * | 10/1975 | Scarpino | 324/509 |
| 4,609,865 A | * | 9/1986 | Goodman et al. | 324/519 |
| 4,740,859 A | | 4/1988 | Little | 361/111 |
| 5,278,512 A | * | 1/1994 | Goldstein | 324/509 |
| 5,748,093 A | * | 5/1998 | Swanson et al. | 340/659 |
| 5,994,892 A | * | 11/1999 | Turino et al. | 324/142 |
| 6,396,284 B1 | | 5/2002 | Tisdale et al. | 324/525 |
| 6,549,388 B1 | | 4/2003 | Robinson | 361/111 |
| 6,560,086 B1 | | 5/2003 | Mechanic | 361/111 |

* cited by examiner

*Primary Examiner*—Ronald Leja
(74) *Attorney, Agent, or Firm*—Smith & Hopen, P.A.; Molly L. Sauter

(57) ABSTRACT

In accordance with the present invention, a method is provided whereby the transient voltages presented at the input to a watt-hour meter are suppressed to prevent damage to the watt-hour meter and to the electronic devices that are powered through the watt-hour meter. In addition to transient voltage protection, the method of the present invention also provides monitoring of the earth ground resistance, voltage and current of the earth ground conductor associated with the watt-hour meter. As such, voltage transients are suppressed when presented at the watt-hour meter through the power line input, ground resistance of the earth ground conductor in continuously monitored and the current and voltage conditions existing on the ground conductor are continuously monitored. Visual and audible indicators are provided to indicate quality issues with the grounding system and the effectiveness of the surge suppressor/arrestor.

38 Claims, 9 Drawing Sheets

TRANSIENT VOLTAGE PROTECTION AND GROUND STATUS MONITORING APPARATUS AND METHOD

BACKGROUND OF INVENTION

1. Field of Invention

This invention relates in general to the field of power integrity and more specifically to a method and apparatus to provide transient surge protection and continuous ground status monitoring for use with a watt-hour meter.

2. Background of the Invention

Electrical power is supplied to an individual site or service location by external electrical power line conductors provided by the electric utility companies. Typically, incoming power lines are connected to contacts residing within an electrical meter socket mounted on the wall of a building. Electrical load conductors used to supply electricity to the outlets within the site are connected to an additional set of contacts residing within the meter socket. A watt-hour meter is connected into the contacts in the meter socket to measure the electric use of the site.

Transient voltage conditions are known to exist on incoming power lines. The transient voltage conditions can be inherent to the incoming power lines or may be the result of a lightning strike. Surges, or brief pulses of high voltage, can destroy electronic circuitry and cause fire damage. Surge protection devices are well known in the art to provide safeguards against potentially dangerous electrical shock and destructive fire hazards. Additionally, it is known in the art to provide surge protection and transient voltage protection at a watt-hour meter. Watt-hour meter surge protection devices are known in the art to be integrated into the watt-hour meter through the use of meter socket extensions.

In addition to providing adequate surge protection, another important aspect of any electrical system is the establishment of a quality grounding system. The quality of the earth ground is dependent upon soil conditions, including base material, moisture content, the presence of salts and the number, depth and diameter of the grounding rods and their interconnections. A good ground can degrade to become a poor ground due to drought, freezing, erosion of conductive salts and corroded mechanical connections. While a good, quality ground may have been established when an electrical meter was originally installed, changing conditions in the soil and additional factors may result in a poor grounding condition that goes undetected.

In establishing a quality grounding system, consideration must be given to ground conductor resistance, ground current that may be present due to leakage current and ground voltage which is effected by stray voltage conditions.

The establishment and maintenance of a quality grounding system requires continuous monitoring of the ground conductor resistance, ground current and ground voltage.

Consequently, there is a need in the art for a method and device to provide continuous power line surge protection and ground conductor resistance, voltage and current monitoring for use with a watt-hour meter.

It is, therefore, to the effective resolution of the aforementioned problems and shortcomings of the prior art that the present invention is directed.

However, in view of the prior art in at the time the present invention was made, it was not obvious to those of ordinary skill in the pertinent art how the identified needs could be fulfilled.

SUMMARY OF INVENTION

The above and other objects of the invention are achieved in the embodiments described herein by providing a method of insuring power integrity at a watt-hour meter. In accordance with the present invention, a method is provided whereby the transient voltages presented at the input/output to a watt-hour meter are suppressed to prevent damage to the watt-hour meter and to the electronic devices that are powered through the watt-hour meter. In addition to transient voltage protection, the method of the present invention also provides monitoring of the earth ground resistance of the earth ground conductor associated with the watt-hour meter, monitoring of the earth ground current of the earth ground conductor, and monitoring of the earth ground voltage of the earth ground conductor. As such, voltage transients are suppressed when presented at the watt-hour meter through the power line input, ground resistance of the earth ground cable in continuously monitored and the current and voltage conditions existing on the ground cable are continuously monitored. The results of the monitoring steps and the status of the voltage suppressor are provided visually on a status display or audibly as necessary to provide a user with visual and audible indication of the quality of the grounding system and the effectiveness of the surge suppressor.

A watt-hour meter according to the present invention includes two line inputs, a neutral line and an earth ground conductor, the neutral line tied to the earth ground conductor. When an AC transient voltage exceeding a predetermined voltage limit is presented at an input to the watt-hour meter, the resulting voltage is redirected to the neutral line of the watt-hour meter and subsequently to earth ground through the earth ground conductor. According to the present invention, protection from transient voltage conditions is provided by a voltage limiting device connected in parallel across the inputs and neutral lines of the watt-hour meter. In addition to the voltage limiting device, the method of the present invention also includes providing thermal protection of the voltage limiting device utilizing a thermal limiting device connected in series with the voltage limiting device. Additional protection is provided by a current limiting fuse in series with the voltage limiting device. The fuse will open upon failure of the voltage limiting device, thereby preventing an over-voltage condition from reaching the watt-hour meter and subsequently the electronic devices receiving power through the output of the watt-hour meter. This suppression circuit shunts abnormal transient voltages that might damage the meter or electrical equipment. The input to the watt-hour meter is also filtered by providing a radio frequency filter across the two 120V AC power line inputs, thereby establishing a low impedance current path across the power lines toward the earth ground.

According to the present invention, continuous monitoring of the earth ground conductor resistance is afforded by providing a fixed voltage pulse as an input to a drive transformer. The drive transformer output is then positioned to induce a current flow through the earth ground cable responsive to the output of the drive transformer. A sense transformer is then provided for transforming the current flowing through the earth ground conductor into a corresponding voltage. This sense voltage level monitored is inversely proportional to the ground resistance. Aggressive frequency filters are employed to insure that only the unique ground resistance signal is monitored, rejecting other frequencies. The corresponding output voltage of the filter network is then compared to a predetermined voltage limit and the results of the comparison communicated to the status display.

In a preferred embodiment, two voltage comparators are used and the output voltage of the sense transformer is compared to a predetermined voltage limit whereby a first voltage comparator changes state when the output voltage exceeds a ground resistance condition of 25 ohms and a second voltage comparator changes state when the corresponding output voltage is less than a 300 ohm ground resistance condition. With this method, if a ground resistance greater than 25 ohms but less than 300 ohms is sensed on the earth ground cable a warning indicator is presented at the status display. If a resistance greater than 300 ohms is sensed on the earth ground conductor an additional warning indicator is presented at the status display. In a specific embodiment, if a ground resistance of 25 ohms or less is sensed, the status display will illuminate a green LED, indicating a satisfactory condition on the ground conductor. If a ground resistance condition greater than 25 ohms is sensed, the status display will illuminate an amber LED and if a ground resistance condition greater than 300 ohms is sensed, a red LED will be illuminated and an audible alarm will be initiated.

In addition to continuous monitoring of the earth ground resistance, continuous monitoring of the earth ground 60 Hz AC current is provided by the present invention. The same sense transformer used by the resistance monitor is also used by the AC ground current monitor. The sense transformer produces an AC voltage proportional to the 60 Hz AC ground current. The sensor transformer voltage is connected to aggressive frequency filters to insure only the frequencies associated with the 60 Hz AC ground current are monitored, rejecting other frequencies, including the ground resistance signal, which shares the common earth ground.

The corresponding voltage output of the ground current frequency filters is then compared against a predetermined voltage limit and the results of the comparison communicated to a display. The comparator circuit changes state when it detects a peak voltage exceeding the condition of 1 amp of 60 Hz current running through the earth ground conductor. The display then provides a visual indication of this over current condition and an audible alarm is provided.

In addition to continuous ground resistance and ground current monitoring, continuous monitoring of the earth ground voltage is provided. In accordance with the present invention, a metal ground probe is positioned in the ground in close proximity to the watt-hour meter. The AC voltage between the metal ground probe and the neutral line of the watt-hour meter is measured and the results of the measurement communicated to the display when the voltage between the metal ground probe and the neutral line exceeds a predetermined voltage limit. An optically isolated circuit, comprising a light emitting diode and a light sensitive transistor, serve to optically isolate the power line and the monitoring circuitry. If a voltage in excess of 5 volts AC is measured between the ground and neutral wires, sufficient light is produced by the light emitting diode to activate the light sensitive transistor. A resistor in series with the light emitting diode is provided to calibrate the optically isolated circuit for the required 5 volts AC. The light sensitive transistor activates another light emitting diode to provides visual indication of the excess ground voltage. An audible indicator is additionally provided.

The status display of the present invention provides visual indication of the status of the earth ground resistance, current and voltage on a continuous basis. Additionally, an audible indicator is provided to alert the user to excessive conditions. Visual indicators are also provided to alert the user of inoperative fuses within the surge protection circuitry. Audible indicator also alerts the user of inoperative fuses within the surge protection circuitry.

While the status display may reside proximate to the surge suppression and monitoring circuitry, it is also within the scope of the present invention to provide remote monitoring of the system through wireless communication technologies known in the art.

In accordance with the present invention, a watt-hour meter protection device comprising a transient voltage suppression circuit to provide protection from transient voltage conditions at the input to the watt-hour meter, an earth ground resistance monitor to monitor the resistance of an earth ground conductor of the watt-hour meter, an earth 60 Hz AC ground current monitor to monitor the presence of current on the earth ground conductor of the watt-hour meter, an AC earth ground voltage monitor to monitor the presence of voltage on the earth ground cable of the watt-hour meter, and a status display is provided.

In an embodiment of the present invention, the transient voltage suppression circuit includes a voltage limiting device, a thermal limiting device connected in series with the voltage limiting device, a current limiting fuse connected in series with the voltage limiting device, and a radio frequency filter connected in parallel across the thermal limiting device and the voltage limiting device. The voltage limiting device may be a metal oxide varistor and the thermal limiting device may be a positive temperature coefficient thermistor.

The earth ground resistance monitor of the present invention includes a sensor circuit including a drive transformer and a sense transformer, a fixed voltage pulse circuit to induce a fixed voltage pulse onto the driver transformer, the drive transformer and the sense transformer enclose the earth ground conductor, such that the drive transformer forms the primary winding and the ground conductor forms the secondary winding. The fixed voltage pulse is provided by a supply voltage and timing circuitry to establish the desired peak voltage and pulse duration. The earth ground conductor is responsive to the voltage output from the drive transformer to produce a related current in the earth ground conductor and a corresponding voltage output signal in the sense transformer. Utilizing a narrow band pass frequency filter at the output of the sense transformer, a first voltage comparator in circuit communication with the output of the frequency filter, the first voltage comparator changes state when the output voltage exceeds a first predetermined value corresponding to a first predetermined ground resistance condition. Utilizing a second voltage comparator in circuit communication with the output of the frequency filter, the second voltage comparator changes state when the output voltage exceeds a second predetermined value corresponding to a second predetermined ground resistance condition. The outputs of the voltage comparators are used to drive the visual and audible indicators of the status display. In a preferred embodiment, it is desired that the ground resistance be less than 25 ohms. As such, the first voltage comparator determines if the ground resistance is in excess of 25 ohms and the second voltage comparator determines if the ground resistance is greater than 300 ohms. A greater than 25 ohm condition results in a visual indicator at the status display and a 300 ohm condition results in an additional visual indicator at the status display and an audible indicator.

The 60 Hz AC earth ground current monitor of the present invention includes, a sense transformer, a narrow band pass frequency filter circuit, to produce a related voltage in response to the 60H AC current in the earth ground conductor and a third voltage comparator in circuit communication with the output of the frequency filter the output of the third voltage comparator changing state when the filter output voltage exceeds a the third predetermined value corresponding to a predetermined current condition. As such, a voltage comparison utilizing a third voltage comparator corresponding to a current condition in excess of 1 amp of 60 Hz AC current results in a visual and audible indicator.

The AC earth ground voltage monitor of the present invention includes, a metal earth ground probe, the probe positioned in the ground in close proximity to the watt-hour meter, the metal earth ground probe in circuit communication with a neutral line of the watt-hour meter, and a measurement circuit to measure the voltage between the metal earth ground probe and the neutral line of the watt-hour meter, the measurement results communicated to the status display when the voltage between the metal ground probe and the neutral line exceeds a predetermined voltage limit. Measurement of the voltage between the metal earth ground probe and the neutral line is provided by an optically isolated circuit. The optically isolated circuit may include a light emitting diode and a light sensitive transistor. The calibration voltage is set at 5 volts AC by a resistor in series with the light emitting diode. The optically isolated circuit controls a visual indicator in addition to an audible alarm if the ground voltage exceeds 5 volts AC.

According to a preferred embodiment of the present invention, a watt-hour meter protection device is permanently mounted at a watt-hour meter location and provides, a transient voltage suppression circuit to provide protection from transient conditions at the input to the watt-hour meter, an earth ground resistance monitor to monitor the resistance of an earth ground conductor of the watt-hour meter, a 60 Hz earth ground current monitor to monitor the presence of current on the earth ground conductor of the watt-hour meter, an earth ground voltage monitor to monitor the presence of voltage on the earth ground conductor of the watt-hour meter, a metal ground probe, the probe positioned in the ground in close proximity to the watt-hour meter, the metal ground probe in circuit communication with a neutral line of the watt-hour meter, a status display, the status display in circuit communication with the transient voltage suppression/arrestor circuit, the resistance monitor, the voltage monitor and the current monitor.

An advantage of the present invention is that transient voltage protection at a watt-hour meter is provided with the device mounted external to the meter, thereby eliminating the need for meter socket adapters.

Another advantage of the present invention is the reliable operation of the surge suppression circuitry. Dangerous thermal runaway in the event of a sustained over voltage condition across the metal oxide varistor is avoided by the incorporation of a thermistor in series with the voltage limiting device.

Another advantage of the present invention is that continuous monitoring of the ground resistance, ground current and ground voltage are provided to assure that users will be alerted to a high resistance ground or potentially dangerous current or voltage conditions at the service entrance grounding system.

Another advantage of the present invention is the reduction in power requirements of the device afforded by the use of a fixed voltage pulse input to the transformer circuitry.

Another advantage of the present invention is that visual and audible indicators are provided to continuously alert users of the status of the ground conductor variable and the surge arrestor status. Indication of potential hazardous conditions allow for corrective action to be taken before it is too late.

Another advantage of the present invention is a more cost effective solution to ground status monitoring. Monitoring of the ground variable of the present provides visual and audible indicators based on ranges of predetermined values eliminating the need for detailed calculations of exact values requiring a more complex and thus more expensive solution.

Another advantage of the present invention is that it may be easily installed at existing watt-hour meter panels at minimal cost.

Another advantage of the present invention is the ability to monitor ground conditions remotely through wireless solutions.

BRIEF DESCRIPTION OF DRAWINGS

For a fuller understanding of the nature and objects of the invention, reference should be made to the following detailed description, taken in connection with the accompanying drawings, in which.

DETAILED DESCRIPTION

Figure 1:
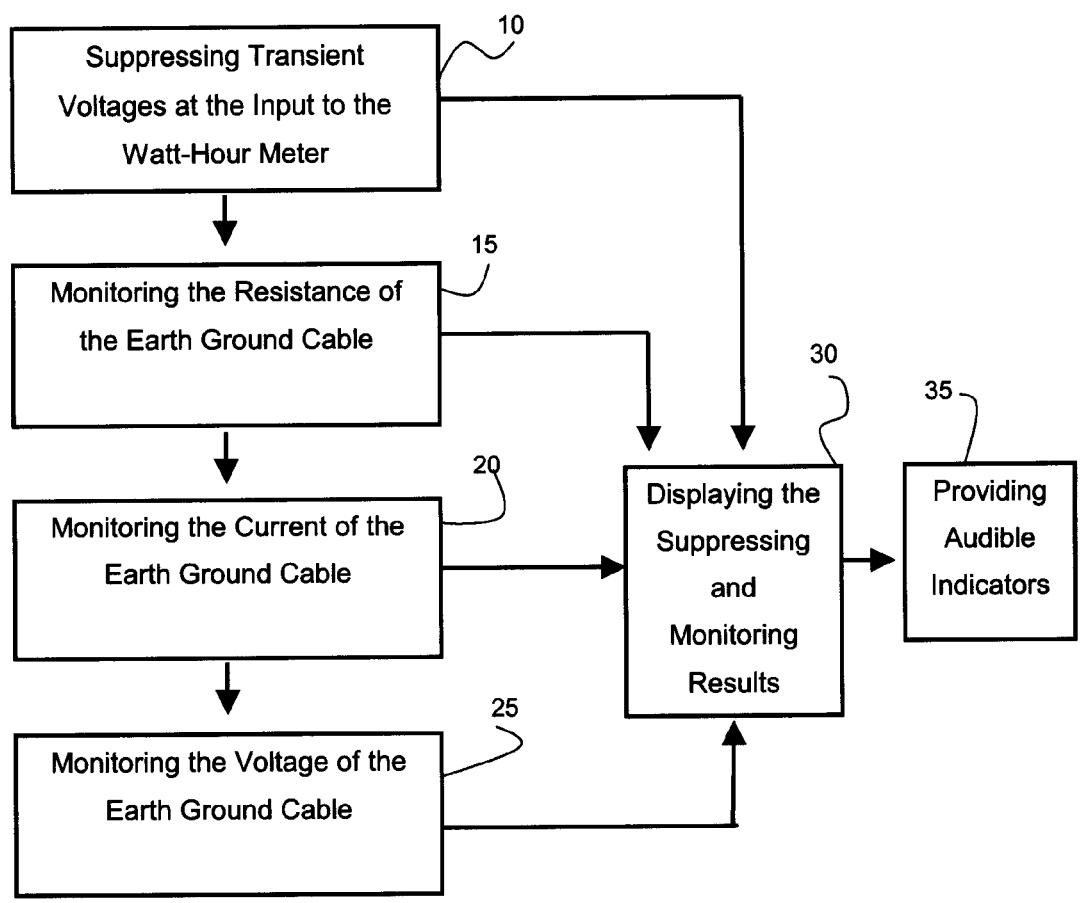
FIG. 1 is a flow diagram in accordance with the present invention.

With reference to FIG. 1, the present invention provides a method of providing transient voltage surge protection and continuous ground status monitoring at a watt-hour meter. According to the present invention, transient voltages at the input to the watt-hour meter are suppressed 10, the earth ground resistance of the earth ground conductor is monitored 15, the earth ground current is monitored 20 and the earth ground voltage is monitored 25. The monitored results are communicated to a display status 30 and a variety of indicators are used to notify the user of hazardous conditions that exist on the ground conductor. Additionally, the status of the suppression circuitry is also communicated and displayed to notify a user of an inoperative fuse. Audible indicators are also within the scope of the present invention 35.

Figure 2:
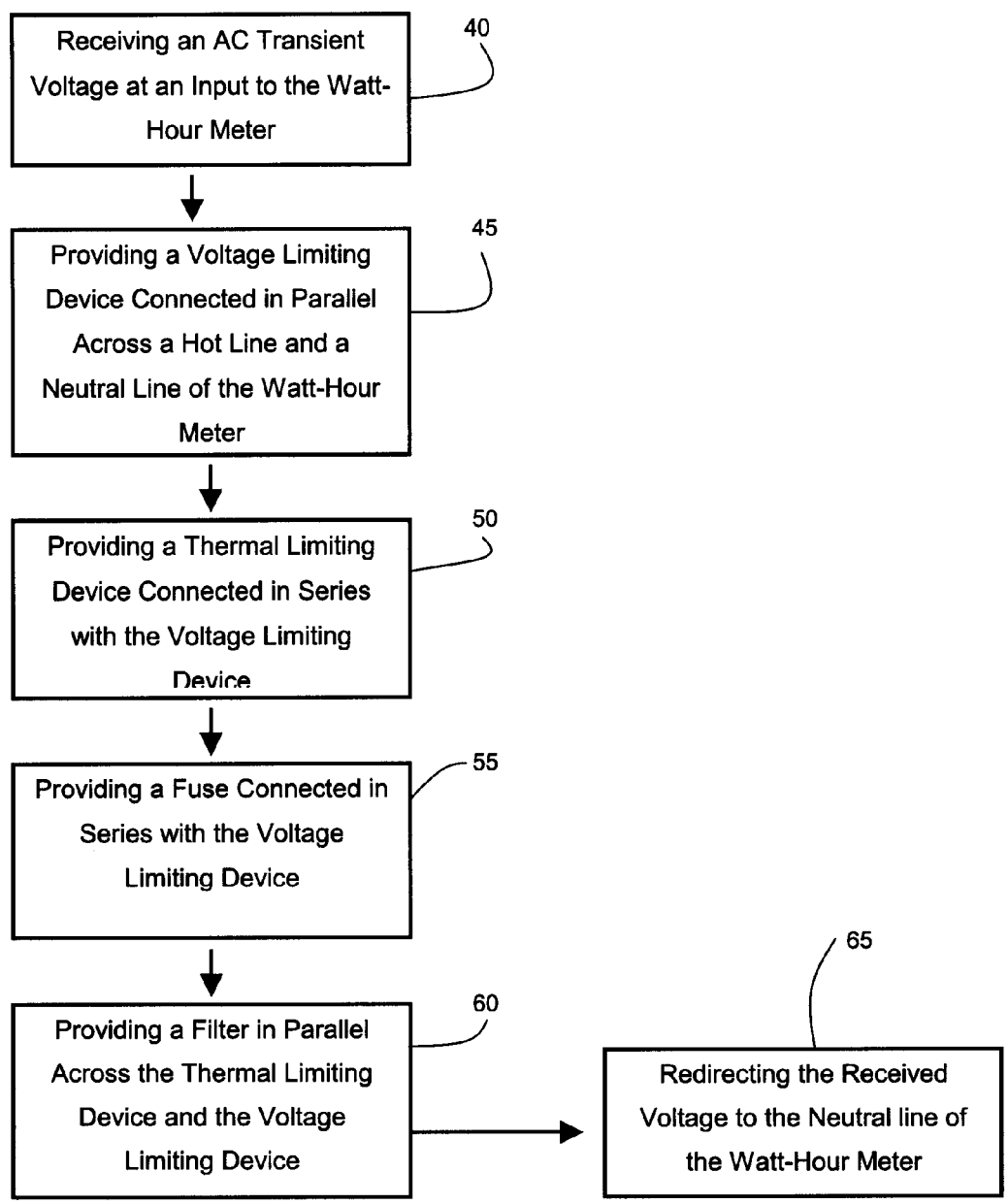
FIG. 2 is a flow diagram illustrative of the transient surge suppression in accordance with the present invention.

As shown in FIG. 2, suppressing transient voltages at the input to the watt-hour meter includes receiving an AC transient voltage at an input to the watt-hour meter 40, providing a voltage limiting device connected in parallel across an incoming hot line and a neutral line of the watt-hour meter 45, providing a thermal limiting device in series with the voltage limiting device 50, providing a fuse connected in series with the voltage limiting device 55, providing a filter connected in parallel across the thermal limiting device 60 and voltage limiting device and thereby redirecting the received transient voltage to the neutral line of the watt-hour meter 65.

Figure 3:
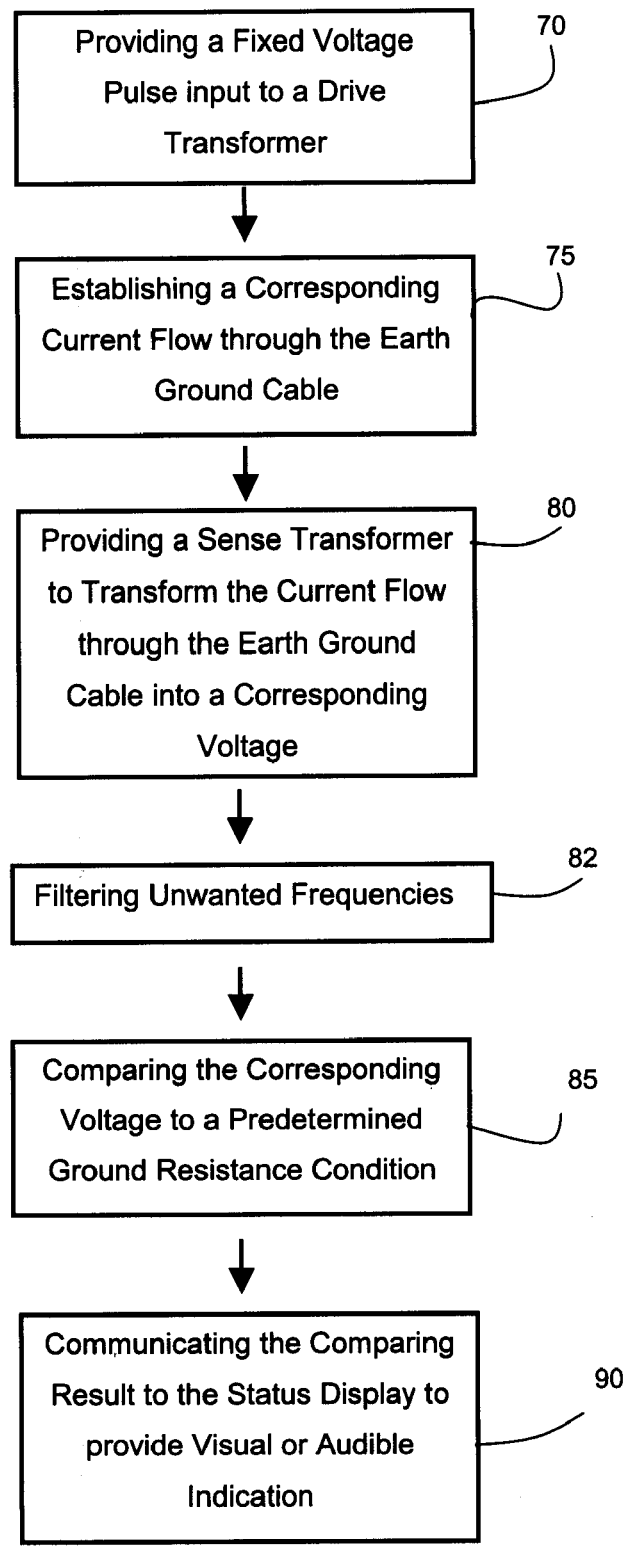
FIG. 3 is a flow diagram illustrative of the ground resistance monitoring in accordance with the present invention.

With reference to FIG. 3, continuous monitoring of the resistance of the earth ground cable includes providing a fixed voltage pulse input to a drive transformer 70, establishing a corresponding current flow through the earth ground cable 75, providing a sense transformer to transform the current flow through the earth ground cable into a corresponding voltage 80, filtering the resistance signal of unwanted frequencies 82, comparing the corresponding voltage to a predetermined ground resistance condition 85 and communicating the comparing results to the status display to provide visual or audible indicators 90.

Figure 4:
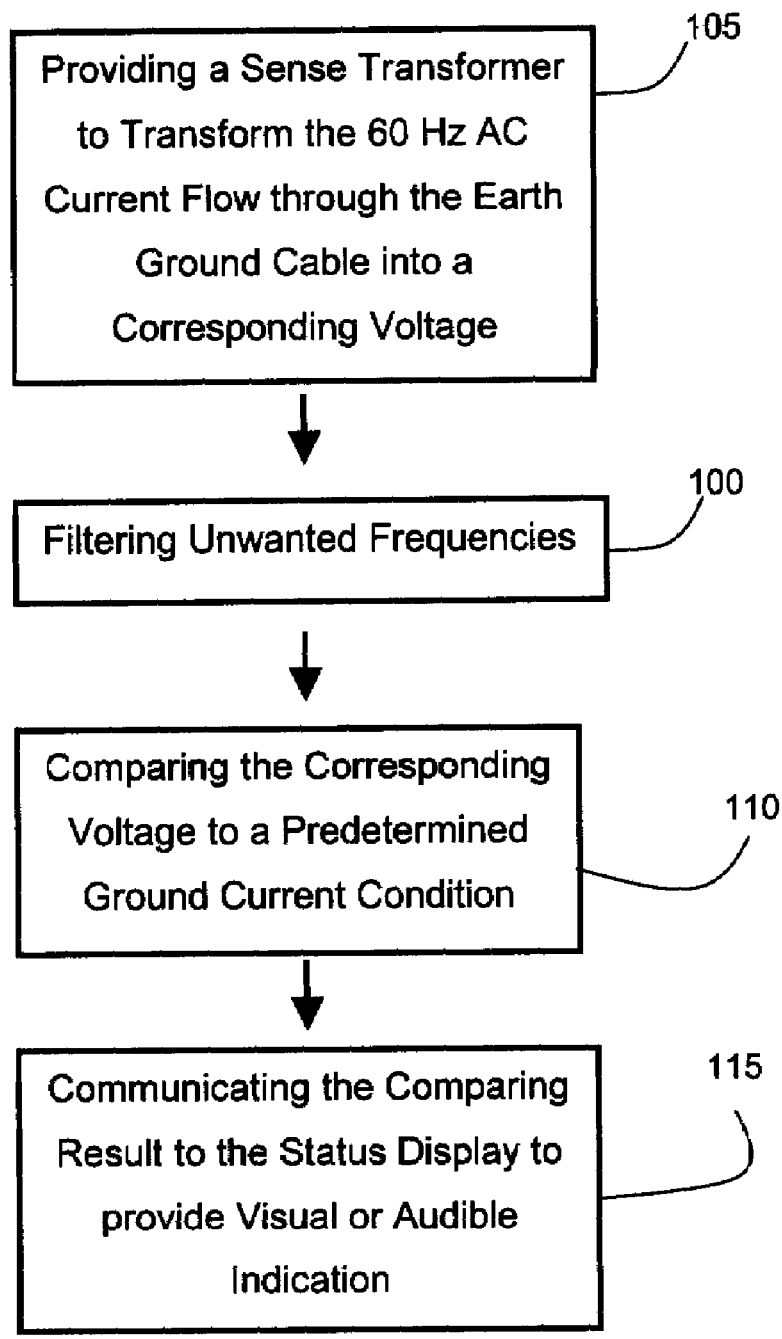
FIG. 4 is a flow diagram illustrative of the ground current monitoring in accordance with the present invention.

With reference to FIG. 4, continuous monitoring of the 60 Hz AC current present on the earth ground cable includes providing a sense transformer to transform the 60 Hz AC current flow through the earth ground conductor into a corresponding voltage 105, filtering the signal of unwanted frequencies 100, comparing the corresponding voltage to a predetermined current condition 110 and communicating the comparing results to the status display to provide visual or audible indicators 115.

Figure 5:
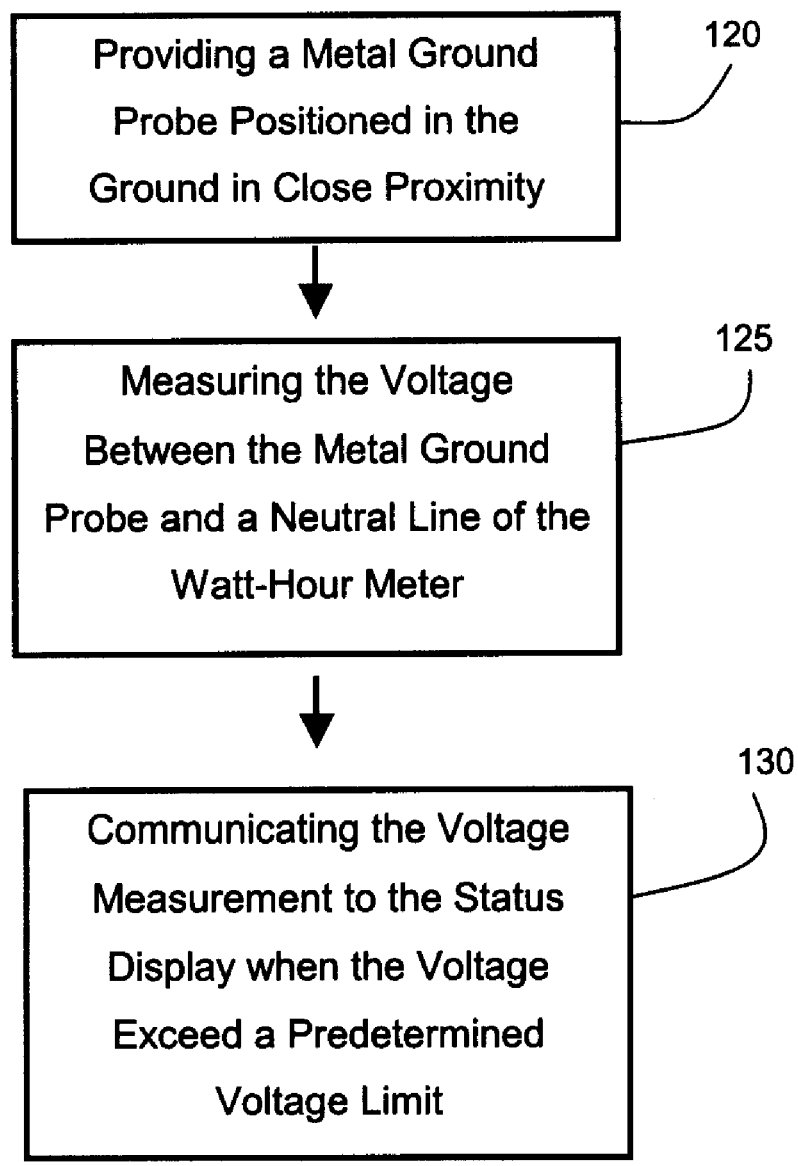
FIG. 5 is a flow diagram illustrative of the ground voltage monitoring in accordance with the present invention.

With reference to FIG. 5, continuous monitoring of the voltage present on the earth ground cable includes providing a metal ground probe positioned in the ground in close proximity to the earth ground conductor 120, measuring the voltage between the metal ground probe and a neutral line of the watt-hour meter 125 and communicating the voltage measurement to the status display when the voltage exceeds a predetermined voltage limit 130.

Figure 6:
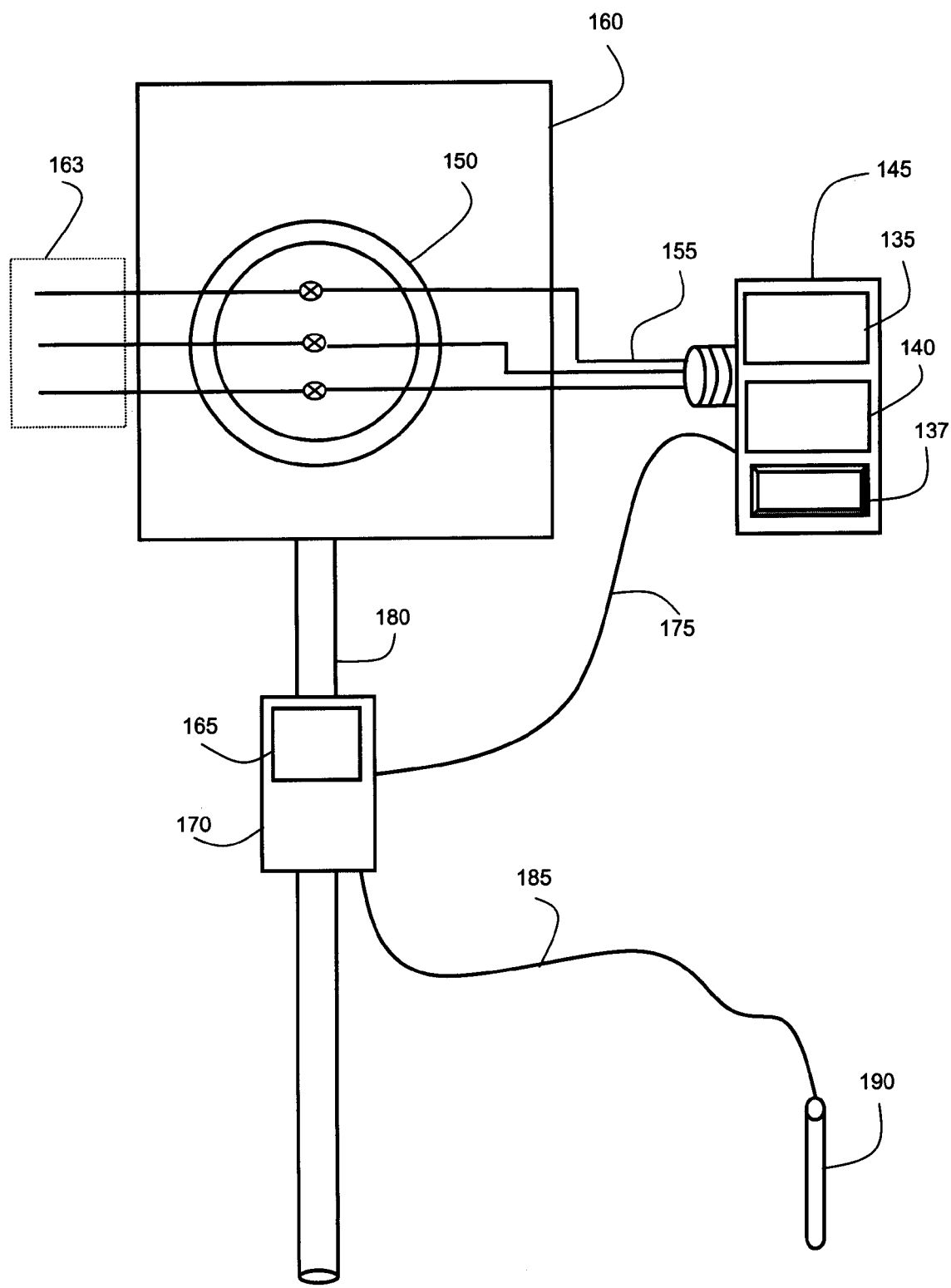
FIG. 6 is an illustrative view of the system in accordance with the present invention.

In one embodiment of the present invention, FIG. 6 illustrates the system in accordance with the present invention, in which an AC voltage suppression circuit 135 and control circuitry 140 and a status display 137, the control circuitry in communication with the monitoring sensor 165. In one embodiment, the suppression circuitry 135, the control circuitry responsive to the output of the monitoring sensor 140 and the status display 137 are housed within a single plastic enclosure 145, which is then wired into a home's electrical system through the watt-hour meter 150, the enclosure having mounting capability 155 to be mounted to the meter housing 60. The watt-hour meter input 163 is provided by the power utility. The ground resistance monitoring sensor circuit 165 is housed in a separate plastic enclosure 170 and is connected to the control circuitry 140 through a five-foot long cable 175. However, it is within the scope of the invention to utilize a wireless communication between the ground resistance monitoring sensor circuit and the suppression circuit. The sensor circuit 165 is slid onto the earth ground conductor 180. The sensor box also contains a short cable 185, which connects to a metal earth ground probe 190.

According to the present invention, the system combines a two-line abnormal transient voltage suppression circuit with a ground monitoring circuit. The suppression circuit absorbs abnormal voltages that might damage electrical equipment. The ground monitoring circuit measures the earth ground resistance, detects current and voltage on the earth ground conductor and activates one or more alarms when they exceed certain limits. If the earth ground resistance is less than 25 ohms, an indicator light on the main plastic enclosure is green. If the earth ground resistance exceeds 25 ohms but is less than 300 ohms, an indication light on the main plastic enclosure switches from green to amber. If the resistance is greater than 300 ohms, the amber light switches from a continuous mode to a flashing mode. If the earth ground voltage exceeds 5 volts AC or if the ground current exceeds 1 amp, a second light will switch from a continuous green state to a red flashing state. During either a ground voltage or ground current fault condition, an audible alarm will also be activated. In addition, should either of the fuses in the suppression circuit open, all lights are extinguished and the audible alarm will be activated.

Figure 7:
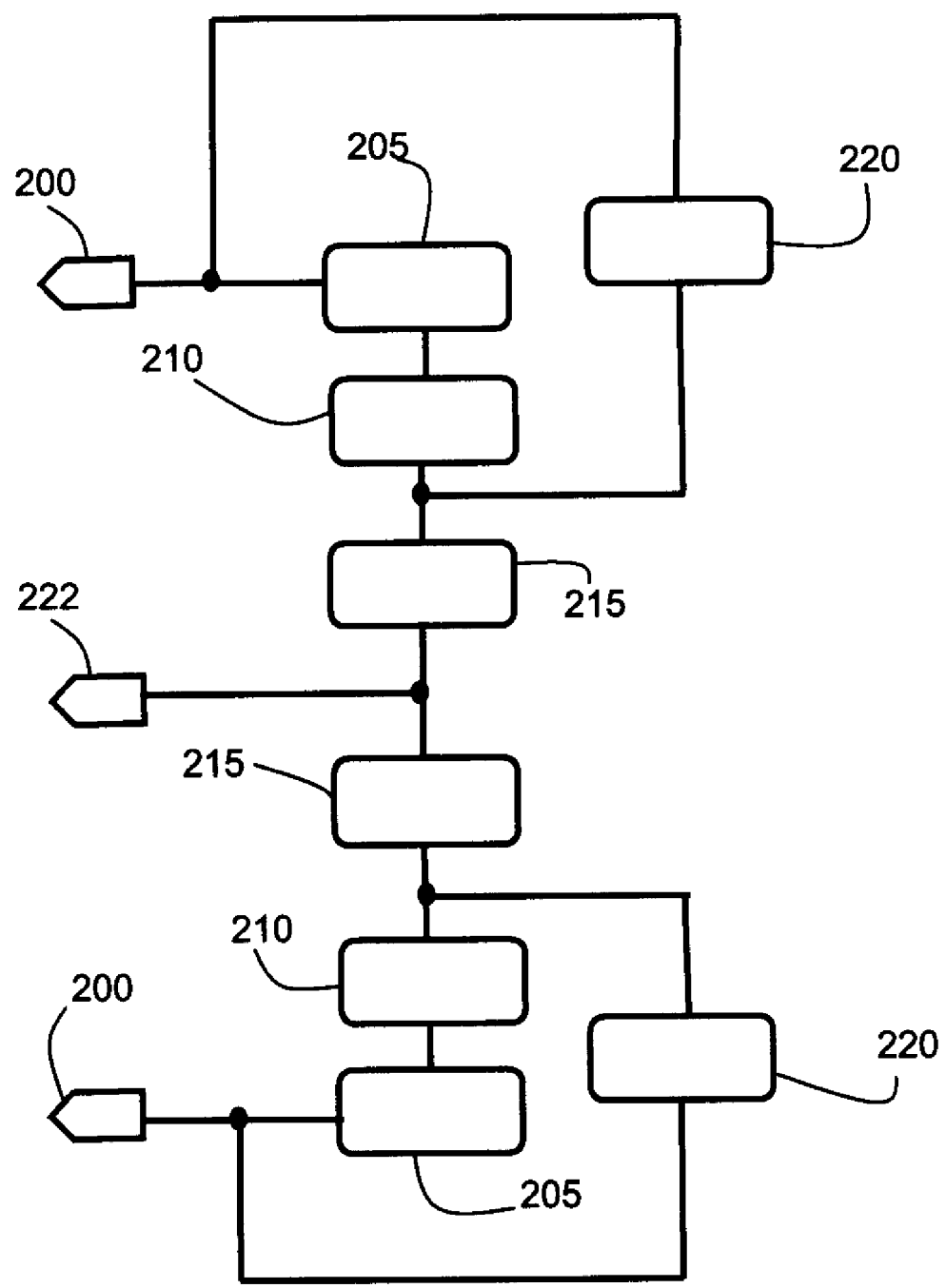
FIG. 7 is an illustrative view of the transient voltage suppression system in accordance with the present invention.

The suppression circuit is designed to shunt power line voltage transients, higher than normal 120 volts AC, which if left untreated, could damage many expensive electronic devices connected to the power line. Often these voltage transients originate from nearby lightning strikes. One embodiment of the present invention, illustrated in FIG. 7, in which a metal oxide varistor 205 is positioned across each of the two power lines, between hot 200 and neutral 222 to absorb the transient voltage. A MOV behaves as a voltage limiting device. In normal voltage conditions, the MOV acts as an open circuit with a high resistance, drawing nearly zero current. When the voltage exceeds the MOV's threshold voltage rating, the resistance of the device quickly lowers, allowing current to flow. Each MOV assembly contains a very low resistance positive temperature coefficient thermistor 210, inside the body of the part, wired in series with the MOV device. If an over-voltage condition continues for any length of time, the excess energy will cause the MOV's temperature to rise. The rise in temperature causes the thermistor resistance to also rise. The added resistance in the circuit then lowers the heat generating current. The thermistor thus limits the energy absorption of the MOV. This thermistor action prevents the MOV from burning up, during prolonged over voltage conditions but allows for a high current path during short transient voltage conditions. Wired in series with each MOV is a large electrical fuse 215. If a very large voltage transient should take place, the fuse opens the MOV and thermal fuse circuit. In addition to the MOV voltage transient surge protection circuit, the PSG suppression circuit also contains a capacitor 220, wired across the two 120 volt AC power lines. The capacitor acts as a radio frequency filter, by providing a low impedance current path across the power lines toward earth ground.

Figure 8:
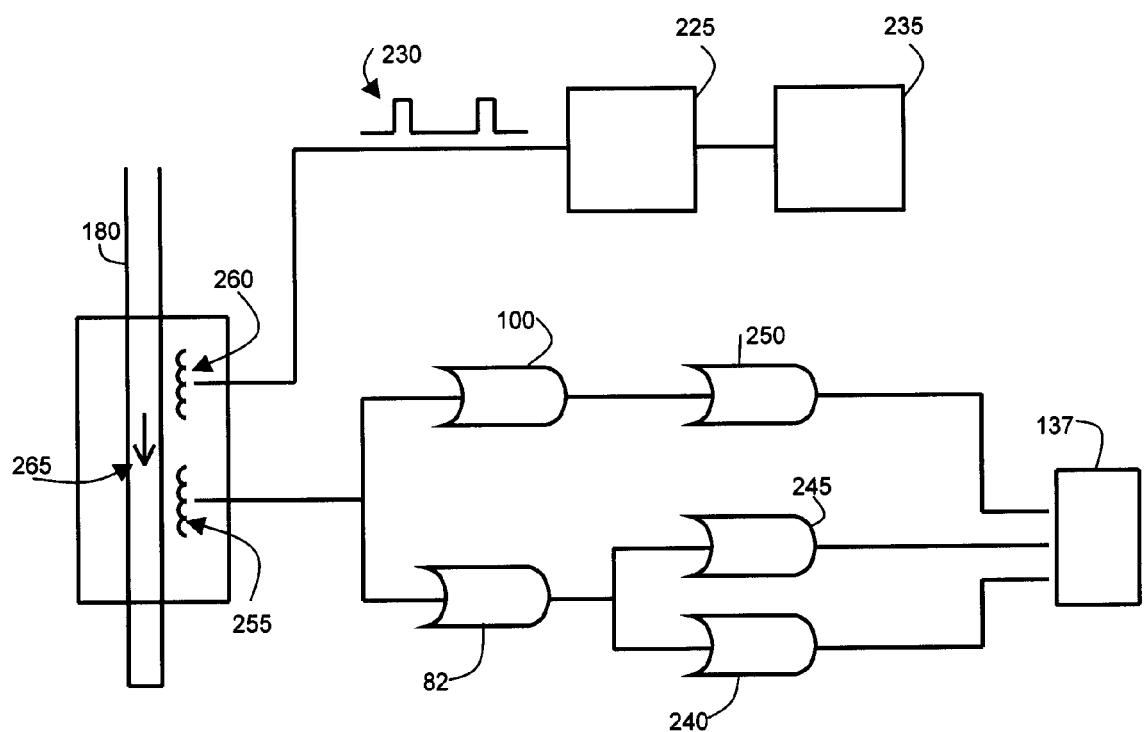
FIG. 8 is an illustrative view of the ground resistance and ground current monitoring system in accordance with the present invention.

With reference to FIG. 8, in accordance with the present invention, the earth ground resistance is measured by inducing a fixed voltage pulse 230 into the ground wire 180 and monitoring the corresponding current flow through the wire 265. The ground wire resistance is inversely proportional to the current. The voltage is induced into the wire, using a transformer technique with a 10:1 turns ratio. The ground wire 180 acts as a single turn secondary, while 10 turns forms the primary transformer winding 260. The corresponding ground wire current is measured with a second transformer 255. That transformer has a 200:1 turns ratio, with the ground wire acting as a single turn primary winding. Both the voltage injection drive transformer 260 and the current monitoring sense transformer 255 are made of ferrite materials, in the shape of a toroid. In one embodiment of the present invention, the two ferrite cores are separated by about two inches, to minimize the effects of stray magnetic fields between the two transformers.

The induced ground voltage pulse 230 is generated by a 555 timer circuit 225 powered by a 12V DC supply 235. The circuit generates a string of 12-volt pulses with a narrow 25 microsecond pulse width. A two-transistor circuit forms a buffer circuit, which can provide up to one amp of drive current. The 12-volt pulse is connected to the 10-turn transformer through a series connected capacitor. The connection forms a classic series resonant circuit. The 10-turn transformer winding provides about 50 microhenries of inductance, while a 0.82 microfarad capacitor forms the series capacitance. The combination produces a circuit that resonates at about 20,000 hertz. The resonant circuit turns the single 25 microsecond voltage pulse into a classic "ring" signal, which lasts about 10 cycles of 20,000 hertz and has an amplitude of about 25 volts peak-to-peak. With a 10:1 turns ratio, the induced voltage into the ground wire is about 2.5 volts peak-to-peak. This ring signal is used to measure the ground resistance. Since short pulses are used, the circuit requires low average power from the +12V supply.

The induced ground wire current 265, which flows through the ground resistance is measured with a 200 turn current transformer. The 200 turn winding has an inductance of about 10 millihenries. The winding is connected to a parallel 5,600 picofarad capacitor and a 5.6K resistor. The parallel 5.6K resistor limits the resonance Q of the circuit network to about 4. The parallel resonance technique forms a bandpass filter circuit, centered on the 20 KHz ring signal frequency. The method helps to reject other unwanted ground signals, which may be collected by the current transformer.

The signal from the current transformer is split into two paths. One path routes the signals from the transformer to a signal processing circuit, designed to monitor the ground resistance. The second path routes the signal to a processing circuit, designed to monitor excessive 60 Hz AC ground current. The resistance path first connects to both a 10 KHz high-pass and a 40 KHz low-pass filter network 82. The action of the two networks forms another bandpass filter, centered on 20 KHz and eliminates most unwanted noise signals that may be collected by the current transformer, monitoring the ground wire current. The filtered ring signal is then connected to two separate voltage comparator circuits. One comparator circuit 240 changes state when the ring peak voltage exceeds the conditions of a ground resistance of 25 ohms. A second comparator circuit 245 changes state when the peak ring voltage is less than the condition of a ground resistance of 300 ohms.

When the ground resistance monitoring comparators detect a less than 25 ohms condition, it sends a 5.0 volts signal to the arrestor interface circuit. If the detected resistance is greater than 25 ohms but less than 300 ohms, it sends a 2.5 volt signal to the arrestor interface circuit. If it detects a resistance greater than 300 ohms, it sends a zero volt signal to the main arrestor circuit. The received signals are then used to provide visual or audible indications to the user on the status display 137, based on the voltage levels.

The second 60 Hz AC ground current monitoring path first routes the signal from the ground current transformer first through a 200 Hz low pass filter 100, then to a voltage comparator circuit 250. The comparator circuit changes state when it detects peak voltages exceeding the condition of 1 amp of 60 Hz AC current, running through the earth ground wire. When the AC current monitoring circuit does change state, a buffer transistor is activated sending an alarm signal to the main arrestor circuit and the status display 137. Some logic circuits in the arrestor assembly switch the red/green LED ground current and ground voltage alarm indicator light from a solid green condition to a flashing red mode, when the ground voltage 1 amp AC. The circuit also activates an audible alarm if the AC current exceeds 1 amp AC.

Figure 9:
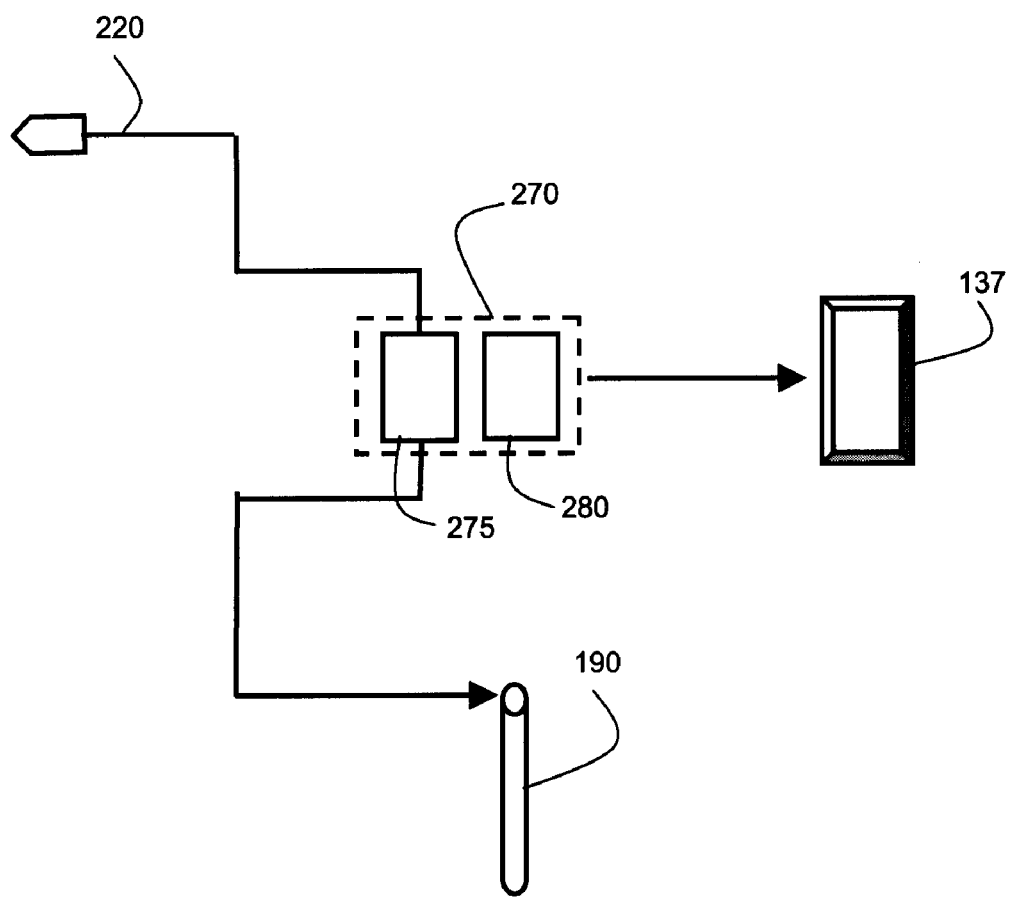
FIG. 9 is an illustrative view of the ground voltage monitoring system in accordance with the present.

With reference to FIG. 9, in accordance with the present invention, the ground voltage is measured between the power line neutral wire 220 and the earth ground probe 190, inside the main arrestor circuit. A metal ground probe is pushed into the ground, near the ground sensor box. A wire connected to the probe is routed through the sensor box and emerges inside the main arrestor box. To maintain isolation between the power lines and the monitoring circuit, an optically isolated circuit 270, inside the arrestor assembly, is used. The isolator consists of a light emitting diode 275, and a light sensitive transistor 280 such as a photo-Darlington transistor, packaged inside a small integrated circuit. If a voltage of 5 or more volts AC exists between the ground and neutral wires, sufficient light is produced by the LED to turn on the photo-Darlington transistor. A resistor in series with the LED calibrates the circuit for the needed 5 volts AC. Additional logic circuits control the red/green LED ground current and ground voltage alarm indicator light for the status display 137. The LED switches from a solid green condition to flashing red condition, when the ground voltage exceeds 5 volts AC. The circuit also activates an audible alarm if the AC voltage exceeds 5 volts AC.

It will be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

The invention claimed is:

1. A method of providing power integrity at a watt-hour meter, the method comprising the steps of:
   suppressing transient voltages at the input to the watt-hour meter;
   monitoring the resistance of an earth ground conductor in circuit communication with the watt-hour meter;
   monitoring the current of the earth ground conductor of the watt-hour meter;
   monitoring the voltage of the earth ground conductor of the watt-hour meter; and
   displaying the results of the suppressing and monitoring steps on a status display.

2. The method of claim 1, wherein the monitoring steps are performed substantially continuously.

3. The method of claim 1, wherein the step of suppressing transient voltages further comprises:
   receiving an AC transient voltage at an input to the watt-hour meter that exceeds a predetermined voltage limit; and
   redirecting the received voltage to a neutral line of the watt-hour meter.

4. The method of claim 3, wherein the step of redirecting the received voltage to the neutral line of the watt-hour meter further comprises:
   providing a voltage limiting device connected in parallel across a hot line and a neutral line of the watt-hour meter;

providing a thermal limiting device connected in series with the voltage limiting device;

providing a fuse connected in series with the voltage limiting device; and providing a radio frequency filter connected in parallel across the thermal limiting device and the voltage limiting device.

5. The method of claim 4, wherein the voltage limiting device is a metal oxide varistor.

6. The method of claim 4, wherein the thermal limiting device is a thermistor.

7. The method of claim 4, wherein the radio frequency filter is a capacitor.

8. The method of claim 3, wherein the predetermined voltage limit is 271 volts peak.

9. The method of claim 1, wherein the step of monitoring the earth ground resistance of the earth ground cable of the watt-hour meter further comprises:

providing a fixed voltage pulse;

coupling the fixed voltage pulse to a drive transformer;

establishing a current flow through the earth ground cable responsive to the output of the drive transformer;

providing a sense transformer;

transforming the current flowing through the earth ground cable into a corresponding voltage;

filtering the resistance signal of unwanted frequencies;

comparing the corresponding voltage to at least one predetermined voltage limit; and communicating the comparing step results to the status display.

10. The method of claim 9, wherein the step of providing a fixed voltage pulse further comprises:

providing a 12 volt DC supply; and providing a timer circuit in circuit communication with the supply to establish the fixed voltage pulse.

11. The method of claim 9, wherein the step of comparing the corresponding voltage to a predetermined voltage limit further comprises:

filtering the corresponding voltage to eliminate noise.

12. The method of claim 9, wherein the step of comparing the corresponding voltage to a predetermined voltage limit further comprises:

providing a first voltage comparator, the first voltage comparator changing state when the corresponding voltage exceeds a 25 ohm ground resistance condition;

providing a second voltage comparator, the second voltage comparator changing state when the corresponding voltage is less than a 300 ohm ground resistance condition;

communicating the first voltage comparator state and the second voltage comparator state to the display.

13. The method of claim 1, wherein the step of monitoring the earth ground current of the earth ground conductor of the watt-hour meter further comprises:

providing a sense transformer;

transforming the current flowing through the earth ground cable into a corresponding voltage;

filtering the signal of unwanted frequencies;

comparing the corresponding voltage to a predetermined voltage limit; and communicating the results of the comparing step to the display when the corresponding voltage exceeds the predetermined voltage limit.

14. The method of claim 1, wherein the step of monitoring the earth ground voltage of the earth ground cable of the watt-hour meter further comprises:

providing a metal ground probe, the probe positioned in the ground in close proximity to the watt-hour meter;

measuring the voltage between the metal ground probe and a neutral line of the watt-hour meter; and communicating the results of the measuring step to the display when the voltage between the metal ground probe and the neutral line exceeds a predetermined voltage limit.

15. The method of claim 14, wherein the predetermined voltage limit is 5 volts AC.

16. The method of claim 14, wherein the step of measuring the voltage between the metal ground probe and the neutral line of the watt-hour meter further comprises:

providing an optically isolated circuit in circuit communication with the metal ground probe and a neutral line of the watt-hour meter.

17. The method of claim 16, wherein the optically isolated circuit comprises a light emitting diode in circuit communication with a light sensitive transistor.

18. The method of claim 1, wherein the step of displaying the results of the suppressing and monitoring steps on a status display, further comprises:

providing a visual indicator on the status display.

19. The method of claim 1, further comprising:

providing an audible indicator responsive to the results of the suppressing and monitoring steps.

20. A watt-hour meter protection device comprising:

a transient voltage suppression circuit to provide protection from transient conditions at the input to the watt-hour meter;

an earth ground resistance monitor to monitor the resistance of an earth ground conductor of the watt-hour meter;

an earth ground current monitor to monitor the presence of current on the earth ground conductor of the watt-hour meter;

an earth ground voltage monitor to monitor the presence of voltage on the earth ground conductor of the watt-hour meter;

a status display, the status display in circuit communication with the transient voltage suppression circuit, the resistance monitor, the voltage monitor and the current monitor.

21. The device of claim 20, wherein the transient voltage suppression circuit further comprises:

a voltage limiting device;

a thermal limiting device connected in series with the voltage limiting device;

a fuse connected in series with the voltage limiting device; and a radio frequency filter connected in parallel across the thermal limiting device and the voltage limiting device.

22. The device of claim 21, wherein the voltage limiting device is a metal oxide varistor.

23. The device of claim 21, wherein the thermal limiting device is a positive temperature coefficient thermistor.

24. The device of claim 21, wherein the radio frequency filter is a capacitor.

25. The device of claim 20, wherein the earth ground resistance monitor further comprises:

a sensor circuit further comprising a drive transformer and a sense transformer;

a fixed voltage pulse circuit to induce a fixed voltage pulse onto the driver transformer;

the earth ground cable in circuit communication with the drive transformer and the sense transformer, the earth ground cable responsive to a voltage output from the drive transformer to produce a related current in the earth ground cable and a corresponding voltage output signal in the sense transformer; a filter network for removing unwanted frequencies, a first voltage comparator in circuit communication with the output of the filter network, the first voltage comparator changing state when the output voltage exceeds a first predetermined value corresponding to a first predetermined ground resistance condition, the output of the first voltage comparator supplied to the status display; and a second voltage comparator in circuit communication with the output of the sense transformer, the second voltage comparator changing state when the output voltage exceeds a second predetermined value corresponding to a second predetermined ground resistance condition, the output of the second voltage comparator supplied to the status display.

26. The device of claim 25, wherein the fixed voltage pulse circuit further comprises:

a direct current voltage supply;

a timer circuit in circuit communication with the voltage supply, the timer circuit to establish the fixed voltage pulse.

27. The device of claim 26, wherein the fixed voltage pulse circuit further comprises:

a filter circuit to eliminate noise in the voltage output of the drive transformer.

28. The device of claim 26, wherein the first predetermined ground resistance condition is 25 ohms.

29. The device of claim 26, wherein the second predetermined ground resistance conditions is 300 ohms.

30. The device of claim 20, wherein the earth ground current monitor further comprises:

a current sense transformer;

a frequency filter network; and a third voltage comparator in circuit communication with the output of the filter network, the output of the third voltage comparator changing state when the output voltage exceeds a the third predetermined value corresponding to a predetermined current condition, the output state of the third voltage comparator supplied to the status display.

31. The device of claim 30, wherein the predetermined current condition is 1 amp of 60 Hz AC current.

32. The device of claim 20, wherein the earth ground voltage monitor further comprises:

a metal earth ground probe, the probe positioned in the ground in close proximity to the watt-hour meter, the metal earth ground probe in circuit communication with a neutral line of the watt-hour meter; and a measurement circuit to measure the voltage between the metal earth ground probe and the neutral line of the watt-hour meter, the measurement results communicated to the status display when the voltage between the metal ground probe and the neutral line exceeds a predetermined voltage limit.

33. The device of claim 32, wherein the measurement circuit further comprises an optically isolated circuit.

34. The device of claim 33, wherein the optically isolated circuit further comprises a light emitting diode in circuit communication with a light sensitive transistor.

35. The device of claim 32, wherein the predetermined voltage limit is 5 volts AC.

36. The device of claim 20, wherein the status display further comprises visual indicators.

37. The device of claim 20, wherein the status display further comprises audible indicators.

38. A watt-hour meter protection device comprising:

a transient voltage suppression circuit to provide protection from transient conditions at the input to the watt-hour meter;

an earth ground resistance monitor to monitor the resistance of an earth ground conductor of the watt-hour meter;

an earth ground current monitor to monitor the presence of current on the earth ground conductor of the watt-hour meter;

an earth ground voltage monitor to monitor the presence of voltage on the earth ground conductor of the watt-hour meter;

a metal ground probe, the probe positioned in the ground in close proximity to the watt-hour meter, the metal ground probe in circuit communication with a neutral line of the watt-hour meter;

a status monitor display, the status monitor display in circuit communication with the transient voltage suppression circuit, the resistance monitor, the voltage monitor and the current monitor.

* * * * *

UNITED STATES PATENT AND TRADEMARK OFFICE
CERTIFICATE OF CORRECTION

| | | |
|---|---|---|
| PATENT NO. | : 7,023,680 B1 | Page 1 of 1 |
| APPLICATION NO. | : 10/605817 | |
| DATED | : April 4, 2006 | |
| INVENTOR(S) | : David Allan Johnson and Pine Marion Brummett | |

It is certified that error appears in the above-identified patent and that said Letters Patent is hereby corrected as shown below:

On The Title Page; Item
Second-named inventor's surname is mispelled. Second-named inventor's name is:

Pine Marion Brumett

Signed and Sealed this

Twenty-third Day of January, 2007

JON W. DUDAS
*Director of the United States Patent and Trademark Office*